(12) United States Patent
Chang et al.

(10) Patent No.: US 8,168,413 B2
(45) Date of Patent: May 1, 2012

(54) LUMINESCENT DIAMOND PARTICLES

(75) Inventors: Huan-Cheng Chang, Taipei (TW);
Wunshain Fann, Taipei (TW);
Chau-Chung Han, Taipei (TW)

(73) Assignee: Academia Sinica, Taipei (TW)

( * ) Notice: Subject to any disclaimer, the term of this patent is extended or adjusted under 35 U.S.C. 154(b) by 1165 days.

(21) Appl. No.: 11/939,311

(22) Filed: Nov. 13, 2007

(65) Prior Publication Data
US 2008/0118966 A1 May 22, 2008

Related U.S. Application Data

(60) Provisional application No. 60/866,883, filed on Nov. 22, 2006.

(51) Int. Cl.
*C12N 13/00* (2006.01)
*C09K 11/08* (2006.01)
*B01J 19/08* (2006.01)

(52) U.S. Cl. ............ 435/173.1; 428/402; 252/301.4 R; 252/301.4 F; 250/433; 204/157.44

(58) Field of Classification Search .................. None
See application file for complete search history.

(56) References Cited

U.S. PATENT DOCUMENTS 4,680,507 A * 7/1987 Uemura et al. .......... 315/111.81
5,012,108 A * 4/1991 Nam et al. ................. 250/484.3

OTHER PUBLICATIONS

Treussart et al, Photoluminescence of Single Colour Defects in 50nm Diamon Nanocrystals, Physica B 376-277 (2006) pp. 926-929 cover sheet showing available online Jan. 2006. doi:10.1016/j.physb.2005. 12.232.*
A. Gruber et al., Scanning Confocal Optical Microscopy and Magnetic Resonance on Single Defect Centers, Science, vol. 276, Jun. 27, 1997, pp. 2012-2014.*
J. Martin et al., Confocal Microscopy of Color Center Distributions in Diamond, Journal of Luminescence 83-84, 1999, pp. 493-497.*
Colpin et al., "Imaging and Sizing of Diamond Nanoparticles," *Optics Letters* 31(5):625-627 (2006).
Davies et al., "Optical Studies of the 1.945eV Vibronic Band in Diamon," *Proceedings of the Royal Society of London. Series A, Mathematical and Physical Science*, 348(1653):285-298 (1978).
Treussart et al., "Photoluminescence of Single Colour Defects in 50 nm Diamond Nanocrystals," *Physica B*, 376-377:926-929 (2006).
Yu et al., "Bright Fluorescent Nanodiamonds: No Photobleaching and Low Cytotoxicity," *J. Am. Chem. Soc.*, 137:17604-17605 (2005).

* cited by examiner

*Primary Examiner* — Emily Le
*Assistant Examiner* — Sarah A Slifka
(74) *Attorney, Agent, or Firm* — Occhiuti Rohlicek & Tsao LLP

(57) ABSTRACT

A method for preparing luminescent diamond particles (e.g., fluorescent nanodiamonds). The method includes irradiating diamond particles with an ion beam and heating the irradiated diamond particles in a non-oxidizing atmosphere at a temperature between 600 and 1000° C. The diamond particles have a diameter of 1 nm to 1 mm and the ion beam has a kinetic energy of 1 KeV to 900 MeV. Also disclosed are luminescent diamond particles prepared by this method and methods of using them.

29 Claims, 2 Drawing Sheets

LUMINESCENT DIAMOND PARTICLES

RELATED APPLICATION

This application claims priority to U.S. provisional application Ser. No. 60/866,883 filed on Nov. 22, 2006, the content of which is incorporated by reference in its entirety.

BACKGROUND

An avenue to understand how biological systems function at the molecular level is to probe biomolecules individually and observe how they interact with each other directly in vivo. Laser-induced fluorescence has been a technique widely adopted for this purpose, thanks to its ultrahigh sensitivity and capabilities of performing multiple probe detection.

In applying this technique to imaging and tracking a single molecule or particle in a biological cell, the progress is often hampered by the presence of ubiquitous endogenous components, such as flavins, nicotinamide adenine dinucleotides, collagens, and porphyrins that produce high fluorescence background signals. These biomolecules typically absorb light at wavelengths in the range of 300-500 nm and fluoresce at 400-550 nm. To avoid such interference, some biological fluorescent probes absorb light at a wavelength longer than 500 nm and emit light at a wavelength longer than about 600 nm. At these wavelengths, the emission has a long penetration depth through cells and tissues. Organic dyes and fluorescent proteins are frequently used to meet such needs. However, the detrimental photophysical properties of these molecules, such as photobleaching and blinking, can restrict their applications for long-term in vitro or in vivo observations.

Fluorescent semiconductor nanocrystals have a number of advantageous photophysical properties such as high photobleaching thresholds, broad excitation but narrow emission spectra, and allowing multicolor labeling and detection. Yet, most of them are toxic. Consequently, prior to use, their surfaces often have to be modified to reduce cytotoxicity and human toxicity. However, surface modification can change the photophysical properties of semiconductor nanocrystals, thus limiting the scope of their biological application.

There is a need to find an alternative labeling material which has both outstanding photophysical properties and are low- or non-toxic.

SUMMARY

Diamond particles are an alternative to the organic dyes and semiconductor nanocrystals. They are chemically inert, biocompatible, optically transparent, and capable of fluorescing from point defects. Moreover, the surface of diamond can be easily functionalized for specific or nonspecific binding with nucleic acids and proteins without affecting its fluorescence properties.

Accordingly, the present invention relates to luminescent diamond particles ("LDPs"), such as fluorescent nanodiamonds ("FNDs").

One aspect of this invention features a method of making LDPs. The method includes an irradiating step and a heating step. More specifically, diamond particles with a diameter of 1 nm to 1 mm are first irradiated by an ion beam having a kinetic energy of 1 KeV to 900 MeV, and then heated in a non-oxidizing atmosphere at 600 to 1000° C. The ion beam can have either positive or negative polarity. In one implementation, the diamond particles have a nitrogen content of 10 ppm to 1000 ppm.

The ion beam, used in the irradiating step, preferably having a kinetic energy of 10 KeV to 10 MeV (e.g., 20 KeV to 5 MeV, 40 KeV to 2 MeV, or 100 KeV to 600 KeV), can be a hydrogen ion beam (including a proton beam), a helium ion beam, a boron ion beam, a carbon ion beam, a nitrogen ion beam, an aluminum ion beam, a phosphorus ion beam, or a silicon ion beam. When a proton beam is used, it can have an ion flux between $10^{13}$ ions/cm²·s and $10^{16}$ ions/cm²·s (e.g., between $10^{14}$ ions/cm²·s and $10^{15}$ ions/cm²·s). After the heating step, preferably performed at 700 to 900° C., one can also oxidize the heated diamond particles at a temperature between 300 and 600° C.

Before the irradiating step, one can dispose the diamond particles on a transport belt that is configured to move the diamond particles to a location for irradiation by the ion beam and, after the irradiating step, move the irradiated diamond particles away from the location. Preferably, the disposing step is performed by mixing the diamond particles and ethanol to obtain a uniform suspension and depositing the suspension onto the transport belt. The transport belt is preferably formed of a conductive material, e.g., copper.

Another aspect of this invention features a composition that includes a plurality of LDPs, each of which, 1 nm to 1 mm in diameter (e.g., 5 nm to 500 µm) has 5 ppm to 1000 ppm color centers (e.g., 5 ppm to 500 ppm). The color centers can include negatively charged nitrogen-vacancy defects and neutral nitrogen-vacancy defects.

Still another aspect of this invention features a system for producing the aforementioned LDPs. The system includes a supply reel; a removal reel; a belt connected to the supply reel and the removal reel for transporting diamond particles; a vacuum-withholding chamber for enclosing the supply reel, the removal reel, and the belt; and an ion source for providing an ion beam. The supply reel is configured for moving the belt to transport the diamond particles to a location for irradiation by the ion beam and the removal reel is configured for moving the belt to transport the particles away from the location after the irradiation.

The belt is preferably formed of a conductive material such as copper. The ion source provides an ion beam having a kinetic energy of 1 KeV to 900 MeV (e.g., 10 KeV to 10 MeV). A commercial ion implanter can be conveniently used as the ion source. The system can also include a heating source (e.g., in a separate chamber), which is configured to heat the bombarded diamond particles at 600 to 1000° C., preferably 700 to 900° C.

In a further aspect, the invention features a method for imaging a sample as follows. A sample is labeled with a luminescent diamond particle and then irradiated with an exciting light. An image of at least a portion of the sample is then generated based on a signal collected from the excited sample. The LDP, 1 nm to 1 mm in diameter (e.g., 5 nm to 500 µm), has 5 ppm to 1000 ppm color centers (e.g., 5 to 500 ppm). The signal from the excited sample includes fluorescence emitted from the diamond particle in response to the exciting light which preferably has a wavelength between 400 nm and 1200 nm. The sample can be a biological sample (e.g., a cell, a virus, a carbohydrate, a nucleic acid, a protein, or a peptide).

LDPs of this invention, emitting bright fluorescence (e.g., at 550-800 nm), are well suited for biological applications such as biomolecular labeling, cellular imaging, single-particle tracking, drug delivery, and gene therapy carrier. The emission shows no signs of photobleaching and blinking under high-power laser excitation. LDPs are chemically stable and have low cytotoxicity, and their surfaces can be easily derivatized with functional groups for specific biomolecular targeting. Other advantages include but are not limited to low cost, easiness of use, high fluorescence brightness (comparable to that of semiconductor nanocrystals), multi-color-emission capability, and multiphoton-imaging capability. LDPs of this invention can also be used as stable micrometer-sized and nanometer-sized light sources in semiconductor industries and information technologies as well LDPs of this invention may have non-spherical shapes. The diameter of a non-spherical LDP is the largest distance that can be formed between two opposite parallel lines tangent to its boundary. In general, luminescent objects are objects capable of exhibiting luminescence, i.e., emitting light. Examples of luminescence include but are not limited to fluorescence and phosphorescence. Luminescence can be induced by exposure to light (i.e. photoluminescence) or to electric energy (i.e., electroluminescence). For example, when irradiated or excited by a laser with high enough energy, color centers (e.g., point lattice defects) in diamond fluoresce. The density or concentration of color centers are represented in ppm (i.e., parts per million), 1 ppm in diamond corresponding to a density of $1.76 \times 10^5$ centers/$\mu m^3$ (i.e., atoms/$\mu m^3$).

The details of one or more embodiments of the invention are set forth in the accompanying description below. Other features or advantages of the present invention will be apparent from the following drawings, detailed description of several embodiments, and also from the appending claims.

DETAILED DESCRIPTION

This invention is based, at least in part, on the unexpected finding that LDPs generated by irradiation (i.e., bombardment) of a low-mass ion beam (such as $H^+$ and $He^+$) have a high density of color centers.

Figure 1:
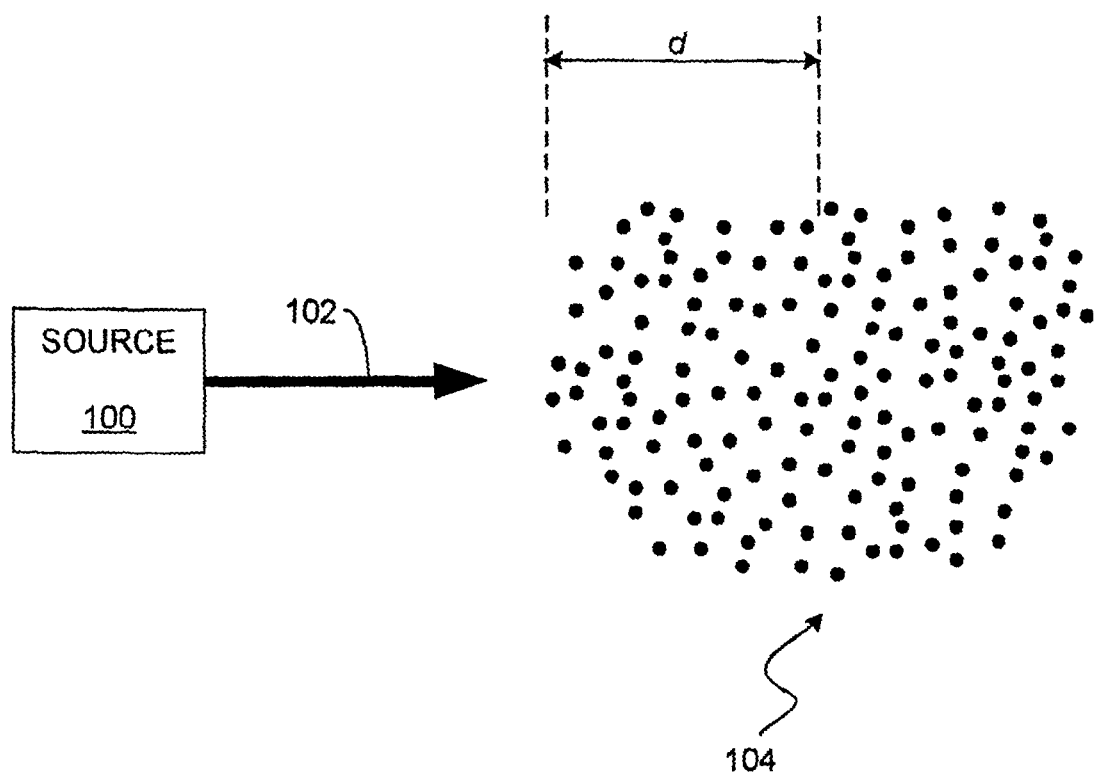
FIG. 1 is a schematic diagram of a procedure for producing luminescent diamond particles.

Conventionally, the color centers in diamond were produced via bombardment of the sample with high energy (typically 2 MeV) electrons generated from a van der Graaff accelerator, followed by thermal annealing at elevated temperatures (typically 800° C.). The requirement for such highly specialized equipment prevents the mass production of LDPs. Accordingly, within the scope of this invention is a new method to produce bright luminescent (e.g., fluorescent) diamond particles economically as well as on a large scale. Referring to FIG. 1, an ion source 100 emits an ion beam 102 to bombard a collection 104 of diamond particles (e.g., having a diameter of 1 nm to 1 mm, 10 nm to 1 $\mu m$, or 20 nm to 100 nm). The ion beam has a kinetic energy of 1 KeV to 900 MeV (e.g., 20 KeV to 5 MeV, or 40 KeV to 600 KeV). This energy is large enough so that the ions have a penetration depth d (e.g., greater than about 10 times the average diameter of the diamond particles for some processes). The penetration depth d represents how far an ion would penetrate into a solid diamond crystal. When the penetration depth is larger than the size of the particles, on average each ion has enough energy to generate multiple defects in multiple particles. These defects act as color centers that can provide a fluorescence signal. This energy is achievable in an ion beam without needing to impart as much acceleration as in an electron beam with the same effectiveness for generating color centers. A commercial ion implanter can be used to provide the needed energy, for example. In particular, a commercially available, medium-energy (e.g., 40 KeV), high-flux ion source (e.g. $10^{15}$ ions/$cm^2 \cdot s$) can be used for mass-producing LDPs.

Figure 2:
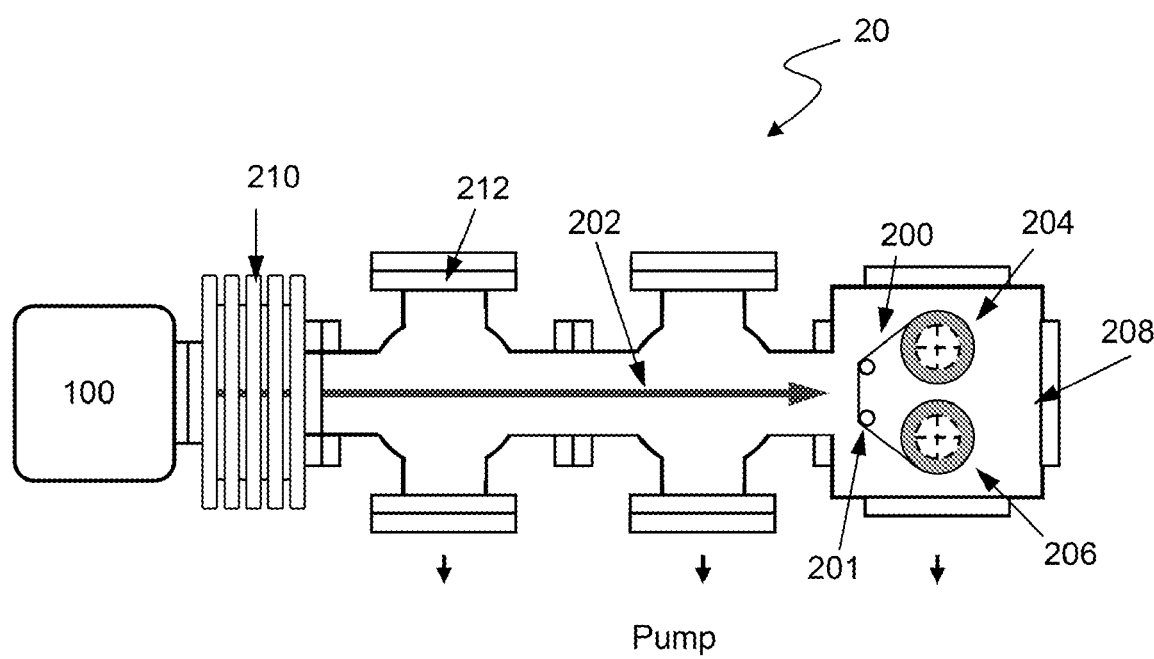
FIG. 2 is a schematic diagram of a system for mass-producing luminescent diamond particles.

Also within the scope of this invention is a system for mass-producing LDPs. Referring to FIG. 2, for example, a mass-production system 20 includes a chamber 208 that can sustain vacuum and an ion source 100 that can generate an ion beam 202. Inside the chamber 208, a belt 200 (e.g., a copper tape) that carries diamond particles is supported at its edge by two rods 201. It then is mounted between a supply reel 204 and a removal reel 206. The ion beam 202 can be guided by a high-voltage acceleration tube 210 in a vacuum chamber 212 to reach the diamond particles on belt 200 and bombard them to produce LDPs. As the belt continuously transports diamond particles into the path of ion beam for bombardment by rotating the two reels using an external motor (not shown), a substantial amount of LDPs are produced within less than an hour.

The ion beam bombardment facilitates the process of obtaining a high density of color centers in the small diamond particles. For example, one type of color center that can be generated in this way is the negatively charged nitrogen-vacancy $(N-V)^-$ defect. After carbon atoms in diamond are displaced by bombardment, the collection 104 of diamond particles is annealed at a high temperature (e.g., at about 800° C. for 2 hours) causing vacancies left behind to migrate to nitrogen atoms found naturally in the type Ib diamond (e.g., with a nitrogen content of at least 100 parts per million) particles to form $(N-V)^-$ defects. For a proton beam with a kinetic energy of 3 MeV, it has a penetration depth of d≈50 $\mu m$ through diamond. Operating such a beam at a fluence of about $1 \times 10^{16}$ ions/$cm^2$ can generate an average of about 10,000 $(N-V)^-$ defects per 100-nm particle, corresponding to an average density of color centers in a particle of $10^7$ centers/$\mu m^3$ or about 50 ppm. (Quantification of N-V centers in diamond is described in detail in Example 5.)

Accordingly, also within the scope of this invention is a composition that has a plurality of luminescent diamond particles with a high density of color centers (e.g., 5 to 100 ppm, 5 to 50 ppm, or 10 to 30 ppm).

The LDPs (e.g., fluorescent nanodiamonds or FNDs) can be used in a variety of areas of biomedical science and biotechnology including, for example, biomolecular labeling, cellular imaging, tumor targeting, single particle tracking, medicinal drug delivery, and as a gene therapy carrier. A variety of techniques can be used including multicolor labeling and imaging, and multi-photon imaging. The low cytotoxicity facilitates in vivo applications of fluorescent nanodiamonds.

For example, a biological sample to be imaged is labeled with the diamond particles and excited with light at an excitation wavelength at around 560 nm or at around 1100 nm (i.e., two-photon excitation). Fluorescence light at a wavelength of around 700 nm is collected from the excited sample. This fluorescence light can be used to generate an image of a portion of the sample labeled with the diamond particles.

The specific examples below are to be construed as merely illustrative, and not limitative of the remainder of the disclosure in any way whatsoever. Without further elaboration, it is believed that one skilled in the art can, based on the description herein, utilize the present invention to its fullest extent. All publications recited herein are hereby incorporated by reference in their entirety.

EXAMPLES

Example 1

Production of Fluorescent Nanodiamonds ("FNDs") by Ion Beam Irradiation

Synthetic type Ib diamond powders with a diameter of 35 nm (MSY, Microdiamant) and 100 nm (Micron+MDA, Element Six) were purified in a concentrated $H_2SO_4$—$HNO_3$ (3:1) solution at 90° C. for 30 min, followed by extensive rinsing with deionized $H_2O$. After separation by centrifugation at 12,000 rpm, 0.1 g of the diamond powders was mixed with 1 mL of deionized water to form a stock solution. A thin diamond film (area ~0.5 $cm^2$ and thickness ~50 μm) was prepared by depositing an aliquot (~50 μL) of the diamond suspension (0.1 g/mL) on a silicon wafer. After being dried in air, the diamond film (~5 mg in weight) was irradiated by a 3-MeV proton beam from a NEC tandem accelerator (9SDH-2, National Electrostatics Corporation) at a dose of $5\times10^{15}$ ions/$cm^2$. Formation of nitrogen-vacancy (N-V) defect centers was facilitated by annealing the proton-beam-treated nanodiamonds at 800° C. in vacuum for 2 hrs. To remove graphitic surface structures induced by the thermal annealing, the freshly prepared FNDs were additionally cleaned in concentrated $H_2SO_4$—$HNO_3$ (9:1, v/v) solution at 75° C., followed by separation with centrifugation and extensive rinsing with deionized water. Both the diamond samples (35 nm and 100 nm) were treated following the same protocols. Since the typical proton beam current from the 3-MeV particle accelerator was 0.1 μA with a spatially averaged beam flux of $6\times10^{11}$ protons/$cm^2$·s at the sample target, it required ~5 h of continuous irradiation to reach the dose of $5\times10^{15}$ ions/$cm^2$. The ion beam irradiation method is also described by the inventors in e.g., Yu et al., *J. Am. Chem. Soc.* 127, 17604-17605 (2005) and Fu et al., *Proc. Natl. Acad. Sci. USA* 104, 727-732 (2007).

Example 2

Mass-Production of FNDs with an Ion Implanter

To mass-produce FNDs, the NEC particle accelerator was replaced by an ion implanter (IMX3500, ULVAC) commonly used in semiconductor industry. In this experiment, the diamond thin film was prepared by electrophoretic deposition. Diamond powders were first suspended in isopropyl alcohol to have a concentration of 0.5 g/L as a stock solution. Prior to the deposition, a 4-inch silicon wafer was mounted on the positive electrode of the electrophoresis with a Teflon ring. The ring-shaped holder not only served as a rigid support but also helped improve the attachment quality of the silicon wafer to the electrode. The wafer-attached electrode was then immersed vertically in the diamond suspension and was positioned at a site separated from the negative electrode by 2 cm. Both the electrodes were made of stainless-steel plates. A 200-V dc voltage was applied between these two plates for 10 min to facilitate deposition of the negatively charged nanodiamonds on the wafer surface. The film thickness was controllable by changing the applied voltage (and therefore the current) as well as the time of the deposition. After the electrophoretic deposition, the diamond samples were dried at 300° C. for 30 min. The typical amount of nanodiamonds deposited on a silicon wafer was ~10 mg with a film thickness of ~1 μm. With the ion implanter operated at a proton beam flux of $6\times10^{13}$ ions/$cm^2$·s, the time required to finish irradiating the entire area (~75 $cm^2$) was less than 10 min. Mass production of the FNDs can be realized by feeding the 4-inch Si wafers automatically into the ion implanter.

A key advantage of using ion beams to generate (N-V)$^-$ centers in diamond is that mass production of FNDs can be carried out routinely and safely with general facilities by lowering the ion irradiation energy to a level of 10 KeV. In a second experiment, a 40-KeV proton beam was applied to diamond powders. According to the SRIM Monte Carlo simulations, the 40-KeV proton can penetrate 0.23 μm through diamond, and the number of vacancies produced per proton is 4. The proton beam used was generated by discharge of pure $H_2$ in a positive RF ion source (National Electrostatics Corporation) and guided by a high-voltage acceleration tube in a vacuum chamber (base pressure ~$2\times10^{-7}$ Torr) built in house. The beam, without any mass discrimination, was composed of ~95% $H^+$ and ~5% $H_3^+$. The output current of the unfocused proton beam emanating from this ion source was constantly ~100 μA, which were nearly three orders of magnitude higher than that of the 3-MeV protons and two orders of magnitude higher than that of the 200-KeV protons. The spatially averaged flux of the 40-KeV proton beam at the target sample was ~$6\times10^{13}$ $H^+$/$cm^2$·s with a beam diameter of ~30 mm. For a proton beam with a penetration depth of only 0.23 μm, the typical dose needed to irradiate the diamond film was ~$1\times10^{14}$ $H^+$/$cm^2$. It means that the time required for irradiation of a 1-$cm^2$ area was less than 2 s.

To realize the use of the 40-KeV proton beam for mass production of FNDs, in a third experiment, nanodiamond powders were deposited on a surface with large areas and were exposed to the ion beam continuously through a "video tape recording" approach. Specifically, the nanodiamond powders were deposited on a long copper type (typically 20-m long and 35-mm wide), followed by insertion of the tape in the path of the 40-KeV proton beam and rotating the tape continuously inside the vacuum chamber using an external stepper motor. To prepare the sample for the proton beam irradiation, the diamond powders were first suspended in 95% ethanol at a concentration of 0.035 g/mL. A diamond suspension of 20 mL was then spread uniformly on the copper tape to cover the entire area (~7000 $cm^2$). As the total amount of nanodiamonds deposited on the copper tape was ~0.7 g, the film has an average thickness of ~0.3 μm. In this experiment, the copper tape typically moved at a speed of ~1 cm/s. Thus, the time required for the proton beam to scan through the entire tape was less than 1 h.

Example 3

Multi-Particle Measurements

Optical images of FNDs (from 3-MeV, 200-KeV, or 40-KeV proton irradiation followed by thermal annealing) were obtained by using a laser scanning confocal fluorescence microscope (C-1, Nikon) equipped with a 100 W mercury lamp. The corresponding spectra of the samples were acquired by using a multichannel spectral analyzer (C7473, Hamamatsu). A red fluorescence from a suspension of the FNDs illuminated by a green laser was observed.

Example 4

Single-Particle Measurements

To observe single FNDs, the particles were first well dispersed in a diluted solution and then spin-coated on a cover glass plate (Marienfeld Laboratory Glassware) at 1000 rpm. A single dye molecule, Alexa Fluor 546 covalently linked to a double-strand ("ds") DNA molecule, was also tested for comparison. The latter was prepared by heating a T50 buffer (10 mM Tris-HCl, pH 8, 50 mM NaCl) containing both 33 bp ssDNA (Integrated DNA Technologies) and 27 bp ssDNA (Integrated DNA Technologies) to 90° C. for 10 min, after which the solution was slowly cooled to room temperature. The solution was finally diluted with the same buffer to a concentration of 40-400 pM prior to spin-coating of the annealed dsDNA molecules on the coverglass plate at 2000 rpm.

The sample-containing glass plate was mounted on a modified confocal optical microscope (E600, Nikon) for inspection. Excitation of the sample was made through a 100× objective (Plan Fluor, NA 1.3 oil, Nikon) using a continuous-wave solid state laser (JL-LD532-GTE, Jetlaser) operating at 532 nm. Epifluorescence passing through a 565 nm long-pass filter (E565lp, Chroma Tech) was collected and detected by an avalanche photodiode (SPCM-AQR-15, Perkin-Elmer). Fluorescence images were first obtained by raster-scanning with a piezo-driven nanopositioning and scanning system (E-710.4CL & P-734.2CL, Physik Instrument). After the images of single FNDs were obtained, each particle was moved consecutively to the focal point of the objective to record the time evolution of the fluorescence intensity. The corresponding spectra were acquired using a monochromator (SP300i, Acton Research) equipped with a liquid-nitrogen-cooled CCD camera (LN/CCD-1100-PB, Princeton Instruments). Fluorescence lifetime measurements were conducted using a frequency-doubled picosecond Nd:YAG laser (IC-532-30, High Q Laser) as the light source. The corresponding fluorescence decays were measured with a time-correlated single photon counting module (SPC-600, Becker & Hickl).

Based on a confocal scanning image of single 35-nm FNDs dispersed on a bare glass substrate, the full width at half maximum (FWHM) of each peak is 2-3 pixels, corresponding to a physical distance of 400-600 nm, which coincides with the diffraction limit of the optical microscope. The observation of these diffraction-limited spots suggests that they derived from single isolated FNDs. This suggestion was indeed confirmed by obtaining a scanning electron microscopy image of the FNDs on the same glass plate, indicating that these particles are well separated. The FNDs have an average size of ~35 nm, consistent with the diameter specified by the vendor. As additional evidence to support the identification of single nanodiamonds, the spectra of dispersed fluorescence showed that each FND emitted a characteristic spectrum in the extended red region, indicative of single particle detection. While the observed fluorescence spectra are highly heterogeneous, two sharp zero-phonon lines (ZPL) can be identified for all 35-nm particles examined. The first ZPL peaking at 576 nm is ascribable to the electronic transition of the neutral defect center $(N-V)^0$, and the second ZPL peaking at 638 nm corresponds to the $^3A \rightarrow ^3E$ transition of the negatively charged defect center, $(N-V)^-$. Both the ZPLs are accompanied with broad phonon sidebands red-shifted by ~50 nm.

Excellent photostability was observed for the single 35-nm diamonds. Under the excitation with the 532-nm light at a power density of $8 \times 10^3$ W/cm$^2$, the fluorescence intensity of the individual FNDs stays essentially the same over a time period of 300 s. No sign of fluorescence intermittency was detected within the time resolution of 1 ms. The behaviors distinctly differ from those of the single dye molecule such as Alexa Flour 546 covalently linked to dsDNA, which photobleached within 12 s.

For the 35-nm FNDs, an analysis of the fluorescence intensity for a large number (~30) of measurements reveals that the brightness of the single nanodiamonds varies roughly 5-fold among the individuals. Such a variation is likely to result from the heterogeneity in size, quantity, as well as the fluorescence quality of the N-V defect centers embedded in different nanocrystallites. On average, the fluorescence intensity of the individual 35-nm FND is higher than that of a singe dye molecule (such as Alexa Flour 546) roughly by one order of magnitude. Regardless of the difference in fluorescence intensity, all the FNDs show similar photostabilities, which indicates that the photostability of FND is size-independent.

The fluorescence lifetime measurements were carried out by investigating the fluorescence decay of 30 individual 100-nm particles. The major component of the decay has a lifetime of 17 nanosecond ("ns"), which is comparable to that (~12 ns) measured for bulk diamonds but is substantially longer than that of the dye molecules (~4 ns for Alexa Flour 546) and cell autofluorescence. Such a difference in fluorescence lifetime would be useful for isolation of the FND emission from these and other background signals using various time-gating methods, with which the contrast of single-nanodiamond imaging in biological cells can further be improved.

Example 5

Quantification of N-V Centers in Diamond

Quantification of the N-V centers in diamond was made by using type Ib diamond single crystals as the sample substrates. The use of single crystals instead of nanocrystals avoided the light scattering loss during the spectroscopic measurements. In this experiment, synthetic type Ib diamond single crystals were obtained from Element Six. They were golden yellow in color and contained typically 100 ppm nitrogen atoms. The as-received diamond flake (~0.8 mm thickness) was first irradiated by a 3-MeV proton beam at a flux of $6 \times 10^{11}$ protons/cm$^2 \cdot$s, followed by annealing at 800° C. in vacuum for 2 hrs. A Fourier-transform infrared (FTIR) spectrometer (MB-154, BOMEM) and a UV-VIS spectrophotometer (U-3310, Hitachi) were used to obtain the infrared and visible absorption spectra of the N-V centers in diamond before and after the irradiation/annealing treatment.

In the obtained FTIR spectrum of the as-received type Ib diamond single crystal, two prominent features were observed at 1130 and 1344 cm$^{-1}$, which have been attributed to the localized vibrational modes of C—N bonds in type Ib diamond. The concentration (in ppm) of atomic nitrogen in its neutral form (i.e., [$N^0$]) was determined to be 109 ppm based on the relation [$N^0$]=37.5$\mu_{1344}$, where $\mu_{1344}$ is the absorption coefficient (in cm$^{-1}$) of the peak at 1344 cm$^{-1}$. In the UV-visible spectrum of the same sample after the aforementioned irradiation/annealing treatment, a sharp zero phonon line (ZPL) can be readily identified at 637 nm (1.945 eV), which is characteristic of the $(N-V)^-$ center, at ~80 K. Observing the sharp ZPL allows one to determine the $(N-V)^-$ concentration (centers/cm$^3$) based on the relation [$(N-V)^-$]=7.1$\times 10^{15}$ $A_{637}$, where $A_{637}$ (in meV·cm$^{-1}$) is the integrated absorption strength of the ZPL (637 nm or 1.945 eV) measured at the liquid nitrogen temperature. Taking 50 μm as the sample thickness, one can determine an $(N-V)^-$ concentration (i.e., [$(N-V)^-$]) of 25 ppm for the specimen irradiated by the 3-MeV protons at a dose of $1 \times 10^{16}$ H$^+$/cm$^2$.

This quantification method is also described by the inventors in e.g., Wee et al., *J. Phys. Chem. A* 111 (38), 9379-9386 (2007).

Example 6

Single-Particle Tracking

Fluorescence images of single FNDs in HeLa cells were acquired using a wide-field epifluorescence microscope (1×70, Olympus) equipped with a Nd:YAG laser (DPSS 532, Coherent) operating at 532 nm (power density ~100 W/cm$^2$) as the excitation source. The resulting emission was collected by a 100×, NA 1.35 oil objective (UPLFL 100×, Olympus) and selected by a 565 nm long-pass filter (E565lp, Chroma Tech) for detection. Images were recorded with an electron multiplying charge-coupled device (DV887DCS-BV, Andor) with a pixel size of 16 µm and an exposure time of 0.1 s.

In order to demonstrate that FND is a promising biomarker candidate for in vivo imaging and diagnosis, 35-nm FND particles were incubated together with HeLa cells cultured in Dulbecco's modified Eagle's medium at 37° C. on a chamber slide. For the HeLa cell, intense cell autofluorescence was observed at 510-560 nm when exposed to the blue light at 478 nm. Switching the laser excitation wavelength to 532 nm and collecting the emission at 650-720 nm, where the FND fluorescence resides, greatly reduce the autofluorescence background signals.

Translocation of the FNDs through the cell's membrane was confirmed by obtaining the vertical cross-section images of the cell with the confocal fluorescence microscope. While many FNDs are found to form aggregates in the cell, some isolated nanodiamonds can be detected in the cytoplasm. These particles are identified as single nanodiamonds because the spot sizes of their images are diffraction-limited and also the fluorescence intensity of them is comparable to that of the single FNDs spin-coated on the coverglass plate (Example 4). It is of interest to note that the FNDs uptaken are mainly distributed in the cytoplasm of the HeLa cell and they are photostable even under continuous excitation of the sample for 20 min at a laser power density of 8×10$^3$ W/cm$^2$. Similar to the findings in Example 4, neither photobleaching nor blinking of the fluorescence was observed.

The experiment of single-particle tracking was also conducted with a 35-nm FND in the cytoplasm of a live HeLa cell. The particle's motion was observed to be Brownian and was confined within an area of 1×1 µm$^2$ near the nucleus over an observation time window of 15 s.

Example 7

Biomolecular Targeting with Surface-Modified FNDs

To demonstrate the biomolecular targeting of FNDs, the diamond particles were first surface-functionalized with amino groups. In this experiment, 8 mg of N-(3-dimethylaminopropyl)-N-ethyl-carbodiimide hydrochloride (EDC; Sigma) and 6 mg of N-hydroxysuccinimide (Sigma) were dissolved together in 5 mL of the diamond suspension containing 6 mg of FND, which was followed by addition of 3 mg of poly-L-lysine (MW ~30,000, Sigma) to the suspension to form covalent linkages with the surface carboxylate groups via EDC. After incubation of the mixture at room temperature for 24 h, the amine-terminated FNDs were thoroughly washed with deionized water and separated by centrifugation before use. To form a single DNA/FND complex, T4 DNA molecules (165.6 kbp, Wako) were fluorescently labeled with TOTO-1 (T3600, Molecular Probes) at a molar ratio of 4 base pairs per dye molecule. The length of the T4 DNA extended from 56 µm to ~75 µm after labeling. To prepare the DNA/FND complex, 3 µg of poly-L-lysine-coated FNDs were suspended in 200 µL of 0.5 TBE buffer (15581-044, Invitrogen) and mixed with T4 DNA at a molar ratio of 8 DNA molecules per FND particle. After incubation at room temperature for 10 min, the sample was diluted to a concentration suitable for single particle detection and 2-mercaptoethanol (Sigma) was added afterwards to the solution with a volume ratio of ~3% to avoid rapid photobleaching of TOTO-1.

As disclosed in US Patent Application Nos. 20060154259 and 20060154304, the surface of nanodiamonds can be easily functionalized with carboxyl groups and their derivatives for specific or nonspecific binding with nucleic acids and proteins. Such a unique characteristic creates many new opportunities for both in vitro and in vivo applications of FNDs. One such example consists of coating carboxylated FNDs with poly-L-lysine (PL) to facilitate specific binding of the particles with DNA through electrostatic interactions.

In this experiment, a single T4 DNA molecule fluorescently labeled with TOTO-1 dye molecules was first stretched on an amine-terminated glass substrate with a channel combing method. How the positively charged FND particles interact with the negatively charged DNA molecules was observed by a wide-field epifluorescence microscope (IX70, Olympus) equipped with a dual view system (Dual-View, Optical Insights) and an argon ion laser (Innova 90, Coherent) operating at 514 nm. The dual-view system is chosen here because it allows simultaneous capture of two images using a single electron multiplying charge-coupled device (DV887DCS-BV, Andor) operating at an exposure time of 0.1 s. The wavelength coverage of each channel is 545-605 nm and 675-685 nm, as defined separately by two bandpass filters (HQ575/60m & HQ680/10m, Chroma Tech).

Two channels were monitored simultaneously to reveal the microscopic details of the interaction between the PL-coated FND and T4 DNA: (1) the shorter wavelength channel detects 545-605 nm emission from both FND and the TOTO-1 dyes intercalated within the T4 DNA molecule and (2) the longer wavelength channel detects 675-685 nm emission from FND only. An overlay of the images from the two channels revealed that the T4 DNA molecule was wrapped around the PL-coated FND particle and stretched to a V-shape configuration. It was also found that the fluorescence intensity of the TOTO-1 dyes decreased to one third of its initial value (owing to photobleaching) after continuous excitation of the sample for 40 s, while the fluorescence intensity of the FND stayed essentially the same during the same period of time. The experiment is also disclosed in Fu et al., *Proc. Natl. Acad. Sci. USA* 104, 727-732 (2007).

Example 8

Multicolor Emission of FNDs

FND with different colors of emission, such as that derived from the H3 defect center (N-V-N) of type Ia diamond, were prepared in a manner similar to that described in Example 1. Similar to that of (N-V)$^-$, the green emission (e.g., peaking 531 nm) of this defect center is bright and also has a quantum efficiency close to 1.

Together with the non-photobleaching behavior, the low cytotoxicity nature and the high brightness of the fluorescence, this multicolor emission capability endows FND with attraction for applications in life science research. For example, FNDs can be used as drug or gene carriers and as a fluorescent probe for two-photon confocal microscopy in in vivo studies.

Example 9

Two-Photon Excited Fluorescence

The two-photon excited fluorescence from the N-V centers in diamond was demonstrated with type Ib diamond single crystals as those used in Example 5. In this experiment, the N-V centers in the diamond samples were produced by 40-KeV proton beam irradiation, followed by thermal annealing at 800° C. in vacuum for 2 h. The excitation light source consisted of a diode-pumped mode-locked Nd:YVO$_4$ laser (IC-400-ps, High Q Laser), which provided both 532 nm and 1064 nm light pulses with widths of 7.5 ps at a repetition rate of 50 MHz. Spectra of both the one-photon and two-photon excited fluorescence, after passing through two 532-nm Raman filters (538AELP, Omega Optical, and LP03-532RU, Semrock) and a 800-nm short-pass filter (E800SP, Chroma), were acquired using a monochromator (SP500i, Acton Research) equipped with a liquid-nitrogen-cooled CCD camera (LN/CCD-Spec10-100B, Princeton Instruments).

Both one-photon and two-photon excited fluorescence spectra of the diamond single crystals were collected at an excitation time of 5 s using a 100× microscope objective, with an incident laser power of 0.08 µW and 15.6 mW for the one-photon and two-photon excitations, respectively. Time domain analysis of the fluorescence revealed that the (N-V)$^-$ centers are photostable even under intensive excitation at a peak power density of 3 GW/cm$^2$ with the ps 1064-nm laser. The fluorescence intensity stays essentially the same after several minutes of continuous excitation. From the power dependence measurement over the intensity range of 0.3-3 GW/cm$^2$, a two-photon process with a slope of 2.01±0.02 in the logarithmic plot was confirmed.

It was observed that the proton-beam-created N-V centers were confined within a small region (~0.23 µm thickness) near the diamond surface. Since the excitation laser was focused to a spot of ~1 µm in diameter, the volume probed was estimated to be ~2×10$^8$ nm$^3$. This volume equals to that of about 400 FND particles with a diameter of 100 nm. The good signal-to-noise ratio of the spectrum strongly indicates that imaging of the individual 100-nm (or even 35-nm) FNDs isolated on a glass substrate or in a living cell with the two-photon fluorescence technique is practical.

OTHER EMBODIMENTS

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

From the above description, one skilled in the art can easily ascertain the essential characteristics of the present invention, and without departing from the spirit and scope thereof, can make various changes and modifications of the invention to adapt it to various usages and conditions. Thus, other embodiments are also within the scope of the following claims.

What is claimed is:

1. A method of making luminescent diamond particles, comprising: irradiating diamond particles with an ion beam, wherein the diamond particles have a diameter of 1 nm to 1 mm and 5 ppm to 1000 ppm color centers and the ion bean has a kinetic energy of 1 KeV to 900 MeV; and heating the irradiated diamond particles in a non-oxidizing atmosphere at a temperature between 600 and 1000° C.; and oxidizing the surface of the luminescent diamond particles.

2. The method of claim 1, further comprising, after the heating step, oxidizing the heated diamond particles at a temperature between 300 and 600° C.

3. The method of claim 1, wherein the ion beam has a kinetic energy of 10 KeV to 10 MeV.

4. The method of claim 1, wherein the diamond particles have a nitrogen content of between 10 ppm and 1000 ppm.

5. The method of claim 4, wherein the hydrogen ion beam includes a proton beam.

6. The method of claim 5, wherein the proton beam has an ion flux between 10$^{13}$ ions/cm$^2$·s and 10$^{16}$ ions/cm$^2$·s.

7. The method of claim 1, wherein the ion beam is selected from the group consisting of a hydrogen ion beam, a helium ion beam, a boron ion beam, a carbon ion beam, a nitrogen ion beam, an aluminum ion beam, a phosphorus ion beam, and a silicon ion beam.

8. The method of claim 1, further comprising, before the irradiating step, disposing the diamond particles on a transport belt that is configured to move the diamond particles to a location for irradiation by the ion beam and move the irradiated diamond particles away from the location after the irradiating step.

9. The method of claim 8, the disposing step is performed by mixing the diamond particles and ethanol to obtain a uniform suspension and depositing the suspension onto the transport belt.

10. The method of claim 9, wherein the transport belt is formed of a conductive material.

11. The method of claim 9, wherein the transport belt is formed of copper.

12. A composition comprising a plurality of luminescent diamond particles, wherein each particle, 1 nm to 1 mm in diameter, has 5 ppm to 1000 ppm color centers, wherein the surfaces of the luminescent diamond particles are oxidized.

13. The composition of claim 12, wherein the color centers include negatively charged nitrogen-vacancy defects and neutral nitrogen-vacancy defects.

14. The composition of claim 12, wherein each particle has 10 ppm to 100 ppm color centers.

15. The composition of claim 12, wherein each particle is 1 nm to 100 nm in diameter.

16. The composition of claim 15, wherein each particle is 1 nm to 35 nm in diameter.

17. The composition of claim 16, wherein each particle is 1 nm to 10 nm in diameter.

18. The composition of claim 12, wherein each particle is 1 nm to 500 µm in diameter.

19. The composition of claim 18, wherein each particle is 1 nm to 1 µm in diameter.

20. The composition of claim 12, wherein luminescent diamond particles have multicolor-emission capability.

21. The composition of claim 20, wherein each particle is 1 nm to 500 µm in diameter.

22. The composition of claim 21, wherein each particle is 1 nm to 1 µm in diameter.

23. The composition of claim 22, wherein each particle is 1 nm to 100 nm in diameter.

24. The composition of claim 23, wherein each particle is 1 nm to 35 nm in diameter.

25. The composition of claim 24, wherein each particle is 1 nm to 10 nm in diameter.

26. A method for imaging a sample, comprising:
    labeling a sample with a luminescent diamond particle;
    irradiating the labeled sample with an exciting light; and
    generating an image of at least a portion of the sample based on a signal collected from the excited sample, wherein the luminescent diamond particle, 1 nm to 1 mm in diameter, has 5 ppm to 1000 ppm color centers and the surface of the particle is oxidized; and the signal includes fluorescence light emitted from the diamond particle in response to the exciting light.

27. The method of claim 26, wherein the sample is a biological sample.

28. The method of claim 27, wherein the biological sample is a cell, a virus, a carbohydrate, a nucleic acid, a protein, or a peptide.

29. The method of claim 26, wherein the exciting light has a wavelength between 400 nm and 1200 nm.

* * * * *